US012764637B2

(12) United States Patent
Zhang

(10) Patent No.: US 12,764,637 B2
(45) Date of Patent: Oct. 13, 2026

(54) NETWORK INFORMATION EXPOSURE METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 416 days.

(21) Appl. No.: 18/327,622

(22) Filed: Jun. 1, 2023

(65) Prior Publication Data

US 2023/0319689 A1 Oct. 5, 2023

Related U.S. Application Data

(63) Continuation of application No. PCT/CN2022/109632, filed on Aug. 2, 2022.

(30) Foreign Application Priority Data

Aug. 6, 2021 (CN) ......................... 202110902447.8

(51) Int. Cl.
*H04W 48/08* (2009.01)

(52) U.S. Cl.
CPC .................................. *H04W 48/08* (2013.01)

(58) Field of Classification Search
CPC ................................ H04W 48/08; H04W 8/00
USPC ...................................................... 455/422.1
See application file for complete search history.

(56) References Cited

U.S. PATENT DOCUMENTS

2020/0374139 A1* 11/2020 Ying ..................... H04W 48/12
2020/0389835 A1* 12/2020 Talebi Fard .......... H04W 48/04
2020/0396000 A1* 12/2020 Ryu ...................... H04W 76/25
2021/0127255 A1* 4/2021 Li ......................... H04W 76/15
(Continued)

FOREIGN PATENT DOCUMENTS

CN 110769466 A 2/2020
CN 111182568 A 5/2020
(Continued)

OTHER PUBLICATIONS

Office Action issued Sep. 17, 2024 in Japanese Application No. 2023-560289.

(Continued)

*Primary Examiner* — Fabricio R Murillo Garcia
(74) *Attorney, Agent, or Firm* — Sughrue Mion, PLLC

(57) ABSTRACT

A network information exposure method performed by an electronic device, including receiving a wireless network information exposure request from an application function (AF) network element, the wireless network information exposure request comprising category information associated with target wireless network information; transmitting the category information to an access and mobility management function (AMF) network element; receiving the target wireless network information from the AMF network element, wherein the target wireless network information is acquired by a base station according to the category information; and transmitting the target wireless network information to the AF network element.

20 Claims, 8 Drawing Sheets

(56) References Cited

U.S. PATENT DOCUMENTS

| | | | | |
|---|---|---|---|---|
| 2023/0209490 A1* | 6/2023 | Zhu | H04W 60/04 455/435.1 |
| 2024/0031870 A1* | 1/2024 | Pan | H04W 4/06 |

FOREIGN PATENT DOCUMENTS

| | | | |
|---|---|---|---|
| CN | 113645640 | A | 11/2021 |
| CN | 113747469 | A | 12/2021 |
| WO | 2021/109488 | A1 | 6/2021 |
| WO | 2021/139394 | A1 | 7/2021 |

OTHER PUBLICATIONS

Translation of the Written Opinion of the International Searching Authority for PCT/CN2022/109632 dated Oct. 14, 2022.

Extended European Search Report issued Apr. 8, 2024 in European Application No. 22852159.7.

Nokia et al., "KI#3, new solution: Providing selected radio information to an App requiring it", SA WG2 Meeting #139e, S2-2003660, Jun. 1-12, 2020, 5 pgs.

International Search Report for PCT/CN2022/109632 dated, Oct. 14, 2022 (PCT/ISA/210).

Written Opinion of the International Searching Authority for PCT/CN2022/109632 dated, Oct. 14, 2022 (PCT/ISA/237).

* cited by examiner

NETWORK INFORMATION EXPOSURE METHOD AND APPARATUS, ELECTRONIC DEVICE, AND STORAGE MEDIUM

RELATED APPLICATION

This application is a continuation application of International Application No. PCT/CN2022/109632 filed on Aug. 2, 2022, which claims priority to Chinese Patent Application No. 202110902447.8, filed with the National Intellectual Property Administration, PRC on Aug. 6, 2021, the disclosures of which are incorporated by reference herein in their entireties.

FIELD

The disclosure relates to the field of communications technologies, and in particular, to a network information exposure method and apparatus, an electronic device, and a storage medium.

BACKGROUND

In some communication networks, network capabilities that can be exposed do not include wireless network information, so capability exposure of the wireless network information cannot be realized.

Therefore, there is a need for a method of realizing the capability exposure of the wireless network information.

SUMMARY

Provided are a network information exposure method and apparatus, an electronic device, and a computer-readable storage medium, which can realize exposure of wireless network information.

Other features and advantages will become more apparent through the following detailed description.

According to some embodiments, a network information exposure method is performed by an electronic device and includes receiving a wireless network information exposure request from an application function (AF) network element, the wireless network information exposure request comprising category information associated with target wireless network information; transmitting the category information to an access and mobility management function (AMF) network element; receiving the target wireless network information from the AMF network element, wherein the target wireless network information is acquired by a base station according to the category information; and transmitting the target wireless network information to the AF network element.

According to some embodiments, a network information exposure apparatus includes at least one memory configured to store program code; and at least one processor configured to read the program code and operate as instructed by the program code, the program code including: first receiving code configured to cause the at least one processor to receive a wireless network information exposure request from an AF network element, the wireless network information exposure request comprising category information of target wireless network information; first transmitting code configured to cause the at least one processor to transmit the category information to an access and mobility management function (AMF) network element; second receiving code configured to cause the at least one processor to receive the target wireless network information from the AMF network element, wherein the target wireless network information is acquired by a base station according to the category information; and second transmitting code configured to cause the at least one processor to transmit the target wireless network information to the AF network element.

According to some embodiments, a non-transitory computer-readable medium stores instructions, the instructions including: one or more instructions that, when executed by one or more processors of a network information exposure device, cause the one or more processors to: receive a wireless network information exposure request from an AF network element, the wireless network information exposure request comprising category information of target wireless network information; transmit the category information to an access and mobility management function (AMF) network element; receive the target wireless network information from the AMF network element, wherein the target wireless network information is acquired by a base station according to the category information; and transmit the target wireless network information to the AF network element.

It is to be understood that, the foregoing general description and the following detailed description are merely for illustration and explanation purposes, and are not intended to be limiting.

DESCRIPTION OF EMBODIMENTS

Figure 1:
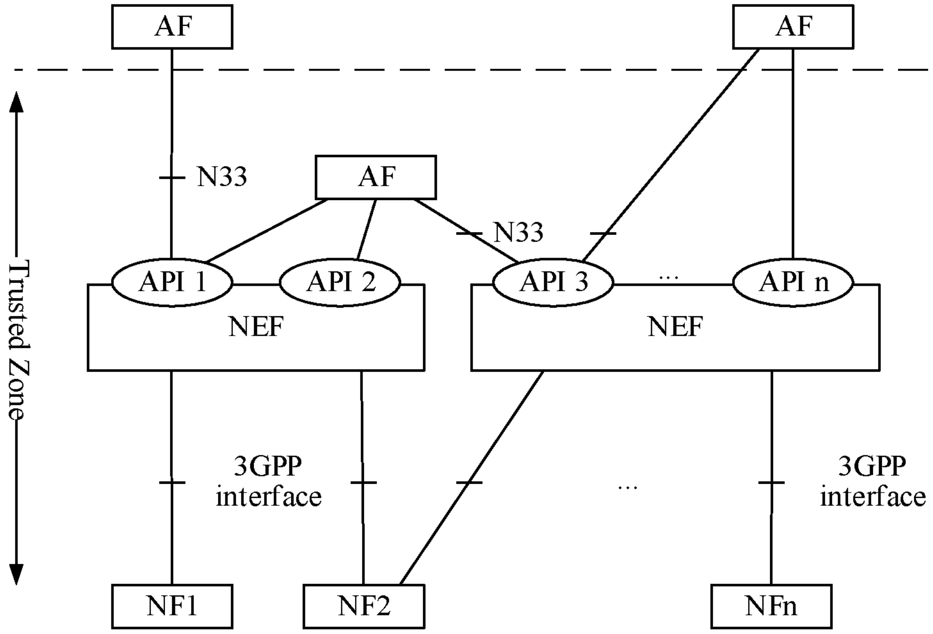
FIG. 1 is a schematic diagram of an architecture of 5G network capability exposure according to an embodiment.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "embodiments" or "some embodiments" may describe a subset of all possible embodiments. However, it may be understood that the "embodiments" or "some embodiments" may be the same subset or different subsets of all the possible embodiments, and may be combined with each other without conflict.

Exemplary implementations will now be described more thoroughly with reference to the accompanying drawings. However, exemplary implementations may be implemented in multiple forms, and it is not to be understood as being limited to the examples described herein. Conversely, the implementations are provided to make the disclosure more comprehensive and complete, and comprehensively convey the idea of the exemplary implementations to a person skilled in the art.

In addition, the described features, structures or characteristics may be combined in one or more embodiments in any appropriate manner. In the following descriptions, a lot of specific details are provided to give a comprehensive understanding of the embodiments of the disclosure. However, a person skilled in the art is to be aware that, the technical solutions in the disclosure may be implemented without one or more of the particular details, or another method, unit, apparatus, or operation may be used. In other cases, well-known methods, apparatuses, implementations, or operations are not shown or described in detail, in order not to obscure the aspects of the disclosure.

The block diagrams shown in the accompanying drawings are merely functional entities and do not necessarily correspond to physically independent entities. For example, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations, and do not need to be performed in the described orders either. For example, some operations may be further divided, while some operations may be combined or partially combined. Therefore, an actual execution order may change according to an actual case.

Particularly, according to an embodiment of the disclosure, the processes described in the following by referring to the flowcharts may be implemented as computer software programs. For example, an embodiment of the disclosure includes a computer program product. The computer program product includes a computer program carried on a computer-readable storage medium, and the computer program includes program code used for performing the methods shown in the flowcharts.

The computer-readable storage medium according to the disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include, but is not limited to, an electrical connection having one or more wires, a portable computer magnetic disk, a hard disk, a random access memory (RAM), a read-only memory (ROM), an erasable programmable read only memory (EPROM, or a flash memory), an optical fiber, a compact disk read-only memory (CD-ROM), an optical storage device, a magnetic storage device, or any appropriate combination thereof. In the disclosure, the computer-readable storage medium may be any tangible medium containing or storing a program, and the program may be used by or used in combination with an instruction execution system, an apparatus, or a device. In the disclosure, the computer-readable signal medium may include a data signal being in a baseband or propagated as a part of a carrier wave, the data signal carrying computer-readable program code. The data signal propagated in such a way may assume a plurality of forms, including, but not limited to, an electromagnetic signal, an optical signal, or any appropriate combination thereof. The computer-readable signal medium may further be any computer-readable storage medium in addition to a computer-readable storage medium. The computer-readable storage medium may send, propagate, or transmit a program that is used by or used in conjunction with an instruction execution system, an apparatus, or a device. The program code included in the computer-readable storage medium may be transmitted by using any appropriate medium, including but not limited to, wireless, wire, optical cable, radio frequency (RF) media, and the like, or any appropriate combination thereof.

The flowcharts and block diagrams in the accompanying drawings illustrate possible system architectures, functions, and operations that may be implemented by a method, an apparatus, and a computer program product according to various embodiments of the disclosure. In this regard, each box in a flowchart or a block diagram may represent a module, a program segment, or a part of code. The module, the program segment, or the part of code includes one or more executable instructions used for implementing designated logic functions. In some alternative implementations, functions annotated in boxes may occur in a sequence different from that annotated in the accompanying drawings. For example, actually two boxes shown in succession may be performed basically in parallel, and sometimes the two boxes may be performed in a reverse sequence. This is determined by a related function. It is to be further noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Embodiments may be implemented in a software manner, or may be implemented in a hardware manner, and the unit described may also be set in a processor. Names of the units are not intended to be limiting.

According to another aspect, the disclosure further provides a computer-readable storage medium. The computer-readable storage medium may be included in the electronic device described in the foregoing embodiments, or may exist alone without being incorporated into the electronic device. The computer-readable storage medium carries one or more programs. The one or more programs, when executed by the electronic device, cause the electronic device to implement the method as described in the following embodiments. For example, the electronic device may implement various operations shown in one or more of FIG. 2, FIG. 3, FIG. 4, FIG. 5, and FIG. 6.

FIG. 1 is a schematic diagram of an architecture of 5G network capability exposure.

In the diagram of the architecture of capability exposure shown in FIG. 1, a network exposure function (NEF) network element interacts with an application function (AF) network element through at least one application programming interface (API) (such as API 1 and API 2 to API n shown in FIG. 1, where n is a positive integer greater than or equal to 1), including for example an N33 interface, acquires a capability call request of an AF, and exposes corresponding information to the AF according to the capability call request. An NEF interacts with other network functions (NFs) (such as NF1 and NF2 to NFn shown in FIG. 1, where n is a positive integer greater than or equal to 1) on a control plane of a 5G core network through service-based interfaces to acquire specific network information required by the AF.

In the solution shown in FIG. 1, a network capability is exposed to the AF through the NEF. However, network capabilities that can be currently exposed may not include wireless network information, so capability exposure of the wireless network information may not be realized.

In addition, in multi-access edge computing (MEC) enhancement, an issue of low-latency network information exposure is raised. Some network information, such as network congestion information or a real-time user-plane latency, needs to be exposed to an application server in real time. Then, the application server may perform application-layer processing based on the information. The network information may become invalid if a call latency of the network information is too long, affecting a subsequent application-layer optimization solution.

Based on the above technical problem, an embodiment of the disclosure provides a network information exposure method.

Figure 2:
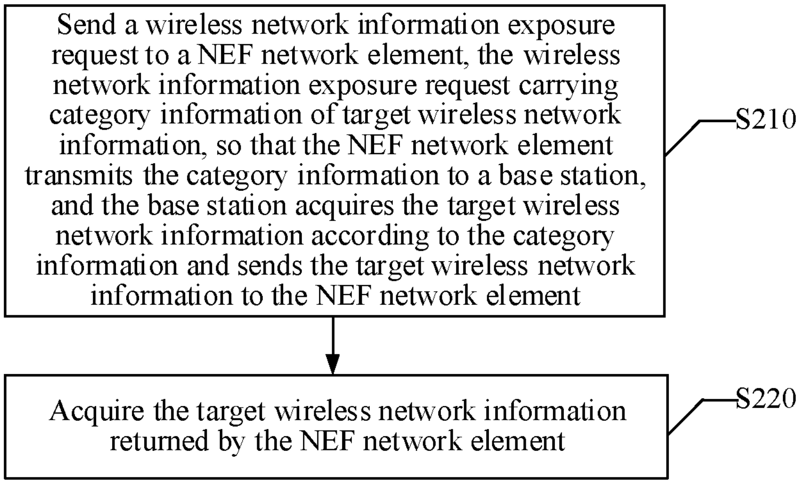
FIG. 2 is a schematic flowchart of a network information exposure method according to an embodiment.

FIG. 2 is a schematic flowchart of a network information exposure method according to an embodiment of the disclosure. The method according to the embodiment of FIG. 2 may be performed by an electronic device, which may be for example the AF network element in FIG. 1.

As shown in FIG. 2, the method according to some embodiments of the disclosure may include the following operations.

Operation S210: Send or transmit a wireless network information exposure request to a NEF network element, the wireless network information exposure request carrying category information of target wireless network information, so that the NEF network element transmits the category information to a base station, and the base station acquires the target wireless network information according to the category information and sends or transmits the target wireless network information to the NEF network element.

In some embodiments of the disclosure, the base station is an interface device for a mobile device to access the Internet, and refers to a radio transceiver station that transmits information between a mobile communication switching center and a mobile phone terminal in a certain radio coverage area. In the following embodiments, the base station is represented by a radio access network (RAN), but embodiments are not limited thereto.

In some embodiments of the disclosure, the wireless network information exposure request refers to a request message sent by the AF and used for requesting exposure of wireless network information. The wireless network information requested to be exposed is called target wireless network information. The category information of the target wireless network information carried in the wireless network information exposure request is used for indicating a category to which the requested target wireless network information belongs. For example, the target wireless network information matches the category information.

In some embodiments, the category information of the target wireless network information may include at least one of packet error ratio (PER) information, access cell information, and average data bit rate information.

In some embodiments, the wireless network information exposure request may further include a target network slice and/or a target data network name (DNN). Then, in addition to matching the category information, the target wireless network information further belongs to a target quality of service (QoS) flow of a target user equipment (UE) establishing a target session according to the target network slice and/or the target DNN.

In some embodiments of the disclosure, the target network slice and/or the target DNN carried in the wireless network information exposure request may further indicate which specific session(s) the requested target wireless network information is for. The specific session is hereinafter referred to as the target session. The AF may obtain the target session through the wireless network information exposure request. The session in some embodiments of the disclosure includes a protocol data unit (PDU) session.

A network slice is used for realizing on-demand networking. In other words, a carrier is allowed to separate a plurality of virtual end-to-end networks on a unified infrastructure and logically or physically isolate each network slice from a RAN, a bearer network, and a core network to adapt to various types of applications. A network slice may be divided into at least three parts, namely a radio network sub-slice, a bearer network sub-slice, and a core network sub-slice.

In some embodiments of the disclosure, the target network slice may be indicated by carrying specific single network slice selection assistance information (S-NSSAI) in the wireless network information exposure request.

The wireless network information exposure request in some embodiments of the disclosure further carries a specific DNN, For example, a target DNN.

In some embodiments of the disclosure, the wireless network information refers to capability information of a wireless side, which may include, for example, PER information, access cell information, average data bit rate information, a transmission latency of a data packet from a UE to a user plane function (UPF) network element, network congestion information, or a real-time user-plane latency, and the like.

In some embodiments, the wireless network information exposure request may further carry an information reporting manner, and the base station reports the target wireless network information according to the information reporting manner.

In some embodiments, the wireless network information exposure request may further carry a required information reporting cycle based on the information reporting manner being a periodic reporting manner, and the base station reports the target wireless network information according to the information reporting cycle based on the information reporting cycle being satisfied.

In some embodiments, the wireless network information exposure request may further carry a defined event based on the information reporting manner being an event trigger manner, and the base station reports the target wireless network information according to the event trigger based on the defined event being satisfied. The defined event is, for example, a threshold, a number of times of event reporting, or the like.

Operation S220: Acquire the target wireless network information returned by the NEF network element.

In some embodiments, the wireless network information exposure request may further carry request application range information, and the acquiring the target wireless network information returned by the NEF network element includes: receiving, from the NEF network element, the target wireless network information satisfying the request application range information. The request application range information is, for example, a specific UE or UE group, or all UEs, a specific time period, or a specific geographic range, and other information.

In some embodiments, if the request application range information includes a target UE identity (ID), the receiving, from the NEF network element, the target wireless network information satisfying the request application range information specifically includes: receiving the target wireless network information of a target UE corresponding to the target UE ID. The target UE ID is used for indicating that the wireless network information exposure request applies to a specific UE. The specific UE is called the target UE.

In some embodiments, if the request application range information includes a target UE group ID, the receiving, from the NEF network element, the target wireless network information satisfying the request application range information specifically includes: receiving the target wireless network information of a target UE in a target UE group corresponding to the target UE group ID. The target UE group ID is used for indicating that the wireless network information exposure request applies to a specific UE group. The specific UE group is called the target UE group. A UE in the specific UE group is called the target UE.

In some embodiments, if the request application range information includes target time period information, the receiving, from the NEF network element, the target wireless network information satisfying the request application range information specifically includes: receiving the target wireless network information of a target UE satisfying the target time period information.

In some embodiments, if the request application range information includes target geographic range information, the receiving, from the NEF network element, the target wireless network information satisfying the request application range information specifically includes: receiving the target wireless network information of a target UE within a target geographic range corresponding to the target geographic range information. The target geographic range information is used for indicating that the wireless network information exposure request applies to a specific geographic range. The specific geographic range is called the target geographic range.

In some embodiments, the acquiring the target wireless network information returned by the NEF network element may include: receiving a RAN exposure information container from the NEF network element, the RAN exposure information container carrying the target wireless network information. The RAN exposure information container is received by the NEF network element from the base station through an AMF network element.

In some embodiments, the target wireless network information is encapsulated in the RAN exposure information container in a data exchange format or in a code stream manner. The data exchange format may be a JavaScript object notation (JSON) format, which is a lightweight data interchange format.

In some embodiments of the disclosure, functions of the AF, NEF, and AMF network elements, a session management function (SMF) network element, the base station, and the like are enhanced, as discussed below.

The AF in some embodiments of the disclosure may support requesting the NEF to expose wireless network information of a specific session (which may be referred to as target wireless network information), for example, PER information, access cell information, average data bit rate information, and the like.

For example, the AF may send or transmit a wireless network information exposure request to the NEF. The wireless network information exposure request may include a specific wireless network information request, a specific network slice (e.g., a target network slice) and/or a specific DNN (e.g., a target DNN), and an information reporting manner (e.g., periodic reporting or event trigger).

The specific wireless network information request may be indicated by a category ID of requested target wireless network information. For example, a category ID of "1" may be used for indicating a request for exposing the PER information, a category ID of "2" may be used for indicating a request for exposing the access cell information, and a category ID of "3" may be used for indicating a request for exposing the average data bit rate information, and so on.

In some embodiments of the disclosure, the NEF is used for receiving the wireless network information exposure request sent by the AF. The NEF may take the information either as a monitoring capability or as parameter-type information that a new network can expose, i.e., wireless network information.

The NEF may encapsulate the information into a RAN exposure request container. The RAN exposure request container may include category information of target wireless network information requested by the side of the AF, for example, PER information, access cell information, average data bit rate information, and the like; and an information reporting manner.

In addition, the NEF may also send or transmit a subscription request to an SMF to subscribe to a notification message of the SMF. The SMF, when establishing a target session corresponding to the target DNN and/or the target network slice, may send or transmit a notification message to the NEF to notify the NEF of information of the target UE, which may include, for example, a QoS flow ID (which may be referred to as a target QoS flow ID).

The NEF, after receiving the notification message sent or transmitted by the SMF, knows that a target session satisfying a condition has been established, and the NEF may send or transmit, to the AMF, a RAN exposure request container which is sent by the AMF to the base station through an N2 message.

Whether the target session satisfying the condition has been established may be determined according to information carried in the wireless network information exposure request. For example, the target network slice and/or the target DNN are/is satisfied.

In another example, if the wireless network information exposure request sent by the AF has a specific geographic range restriction, the SMF may send or transmit the above notification message to the NEF only when a target UE within the specific geographic range establishes the target session satisfying the condition. Then, the NEF may send or transmit the RAN exposure request container to an AMF serving the target UE. The AMF transparently transmits the RAN exposure request container to the base station.

In some embodiments of the disclosure, the AMF is used for receiving the RAN exposure request container sent by the NEF, and transparently transmits the RAN exposure request container to a base station serving the target UE.

In some embodiments of the disclosure, the base station is configured to receive the RAN exposure request container sent by the AMF. The base station may set the RAN exposure request container in the target QoS flow of the target UE.

The base station may detect information of the side of the RAN, and send or transmit requested target wireless network information to the AMF through an N2 interface when a reporting condition is satisfied (e.g., a requirement for an information reporting cycle or a definition of an event is satisfied). The target wireless network information exposed by the RAN may be encapsulated in an RAN exposure information container.

The AMF receives the RAN exposure information container sent by the RAN, and may transparently transmit the RAN exposure information container to the NEF.

In some embodiments of the disclosure, the AF, after receiving the target wireless network information requested to be exposed, may expose the target wireless network information to an application server in real time. The application server may perform corresponding application-layer processing based on the target wireless network information. For example, if the exposed target wireless network information includes network congestion information, a real-time user-plane latency, and the like, resolution of a video may be adjusted, a level of automatic driving may be changed, or the like. For example, an application layer may be optimized.

In some embodiments of the disclosure, the wireless network information exposure request may further carry a capability exposure association ID. The capability exposure association ID is used for associating each wireless network information exposure request with the AF sending or transmitting the wireless network information exposure request. The NEF, when receiving the wireless network information exposure request, may store a mapping relationship between the wireless network information exposure request and the capability exposure association ID. In this way, the NEF, when subsequently receiving the target wireless network information returned by the AMF, may find, through the mapping relationship, the AF sending or transmitting the wireless network information exposure request, in order to return the target wireless network information to the corresponding AF.

For example, the capability exposure association ID may be any one or more of a character string uniquely encoded for each wireless network information exposure request, an AF ID of the AF network element, or an address of the AF, but embodiments are not limited thereto.

Based on the network information exposure method according to this implementation of the disclosure, on the one hand, the AF network element sends or transmits a wireless network information exposure request to the NEF network element, and the wireless network information exposure request carries category information of target wireless network information, so that the base station can acquire requested target wireless network information based on the category information of the target wireless network information, and then the target wireless network information acquired by the base station is returned, by using the NEF network element, to the AF network element sending or transmitting the wireless network information exposure request, in order to realize a wireless network information exposure capability. In some embodiments, a latency of wireless network information exposure can be reduced, thereby meeting a low-latency requirement of the application-layer processing.

The method according to the above embodiment is illustrated below with reference to FIG. 3.

Figure 3:
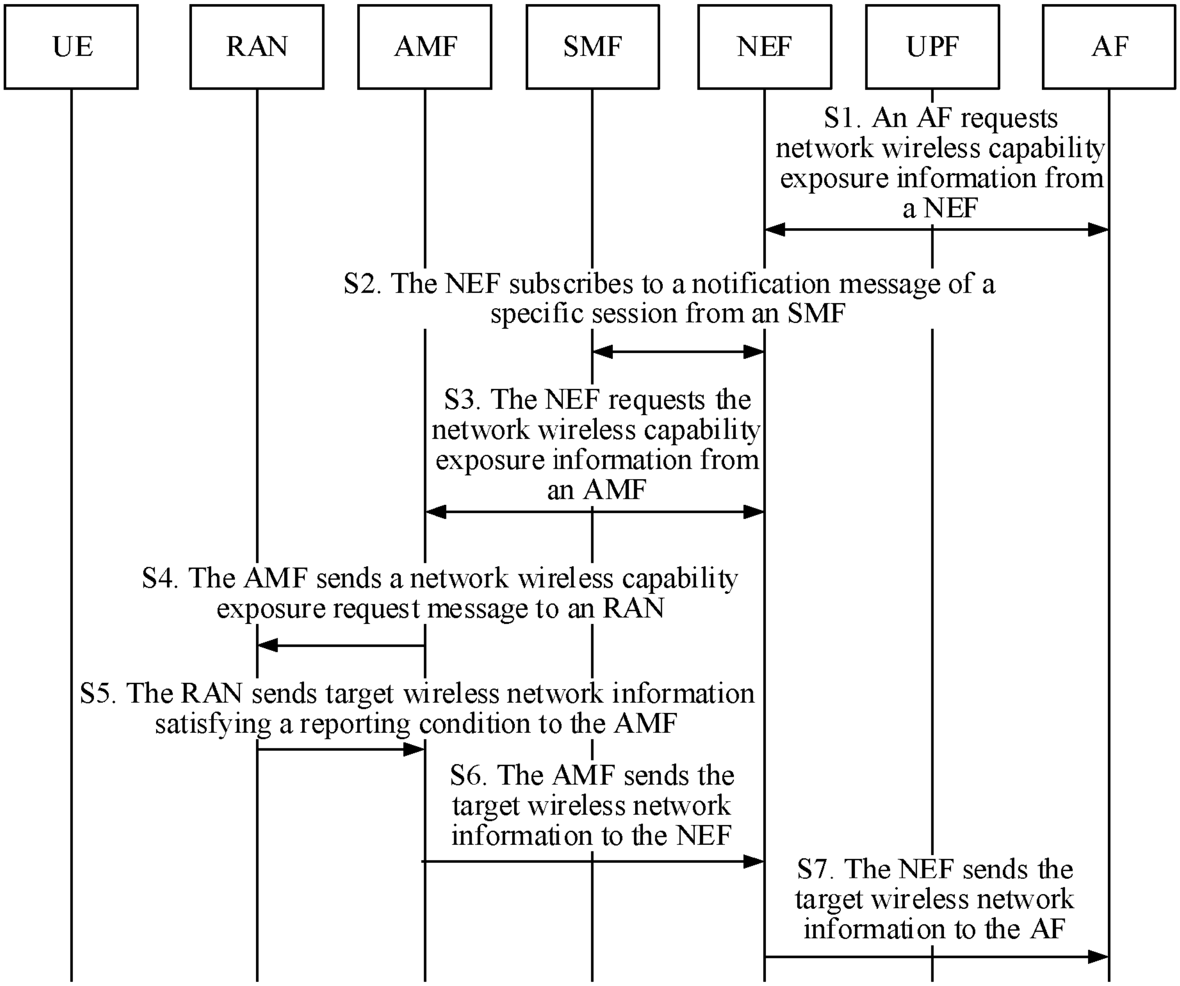
FIG. 3 is a schematic interaction diagram of a network information exposure method according to an embodiment.

FIG. 3 is a schematic interaction diagram of a network information exposure method according to an embodiment of the disclosure.

As shown in FIG. 3, the network information exposure method according to some embodiments of the disclosure may include the following operations:

Operation S1: An AF requests network wireless capability exposure information (i.e., target wireless network information) from a NEF.

In some embodiments of the disclosure, the AF requests network wireless capability information of a specific session (target session) from the NEF. The AF may send or transmit a wireless network information exposure request to the NEF. The wireless network information exposure request may include an AF ID, indication information of specific wireless network information (e.g., category information of target wireless network information), a specific network slice, a specific DNN, an information reporting manner (periodic reporting or event trigger), and the like.

The AF may further indicate an application range of the wireless network information exposure request in the wireless network information exposure request. For example, request application range information is carried, for example, a specific UE, a specific UE group, or all UEs; a specific time period; a specific geographic range, and other information.

In some embodiments of the disclosure, after the NEF receives the wireless network information exposure request sent by the AF, the NEF may authenticate, according to a policy of a carrier and a protocol between the carrier and the AF (called an AF protocol), the wireless network information exposure request sent by the AF. When the authentication is successful, the NEF may accept the wireless network information exposure request sent by the AF and return a request acceptance response message to the AF. For example, it is indicated in the returned response message that the wireless network information exposure request is accepted. When the authentication fails, the NEF may reject the wireless network information exposure request sent by the AF and return a request rejection response message to the AF. For example, it is indicated in the returned response message that the wireless network information exposure request is rejected, and a rejection reason value may be included.

Operation S2: The NEF subscribes to a notification message of a specific session from an SMF.

In some embodiments of the disclosure, the NEF may subscribe to the notification message of the specific session from the SMF according to information carried in the wireless network information exposure request sent by the AF. A subscription request sent by the NEF to the SMF may include the specific DNN or the specific network slice carried in the wireless network information exposure request. In some embodiments, the subscription request may further include a specific UE ID, or a specific UE group ID, or specific time information, or specific geographic range information.

The subscription request is valid for all UEs when the subscription request does not include the specific UE ID. The subscription request is valid only for a specific UE or a specific UE group when the subscription request includes the specific UE ID or specific UE group ID.

When the subscription request includes the specific time information, the SMF may send or transmit a notification message to the NEF only when the subscription request is satisfied within a target time period indicated by the specific time information.

When the subscription request includes the specific geographic range information, the SMF may send or transmit the notification message to the NEF only when a target UE within a specific geographic range corresponding to the specific geographic range information satisfies the subscription request.

According to the subscription request, the SMF may send or transmit the notification message to the NEF when the target UE establishes a target session to the specific DNN or the specific network slice and other requirements (such as the above specific time information) are simultaneously met.

In some embodiments of the disclosure, the notification message may include a target UE ID, an AMF ID, a PDU session ID (i.e., a target session ID), a QoS flow ID (i.e., a target QoS flow ID), and the like.

Operation S3: The NEF requests the network wireless capability exposure information (i.e., the target wireless network information) from an AMF.

The NEF may encapsulate a wireless network information exposure request received from the AF into a RAN exposure request container, and send or transmit the RAN exposure request container, the target UE ID, the PDU session ID, the QoS flow ID, and the like to the AMF.

Operation S4: The AMF sends or transmits a network wireless capability exposure request message to an RAN.

The AMF may encapsulate the RAN exposure request container, the target UE ID, the PDU session ID, the QoS flow ID, and the like in the network wireless capability exposure request message which is then sent to the base station.

Operation S5: The RAN sends or transmit target wireless network information satisfying a reporting condition to the AMF.

The base station, after accepting the wireless network information exposure request, may set the RAN exposure request container in the target QoS flow of the target UE. When it is detected that the reporting condition is satisfied, exposed target wireless network information may be encapsulated in an RAN exposure information container, and the RAN exposure information container is sent to the AMF.

Operation S6: The AMF sends or transmits the target wireless network information to the NEF.

The AMF, after receiving the RAN exposure information container sent by the RAN, sends or transmits the RAN exposure information container to the NEF.

Operation S7: The NEF sends or transmits the target wireless network information to the AF.

Specifically, the NEF sends or transmits the RAN exposure information container to the AF.

Based on the network information exposure method according to this implementation of the disclosure, a specific data packet RAN exposure information container is encapsulated at the base station, target wireless network information that can be exposed is sent to the AMF through the RAN exposure information container and further sent to the NEF through the AMF, and then the RAN exposure information container is sent to the AMF through the NEF, which, on the one hand, can realize exposure of wireless network information, and in some embodiments, can reduce a latency of wireless network information exposure and meet a low-latency requirement of application-layer processing.

Figure 4:
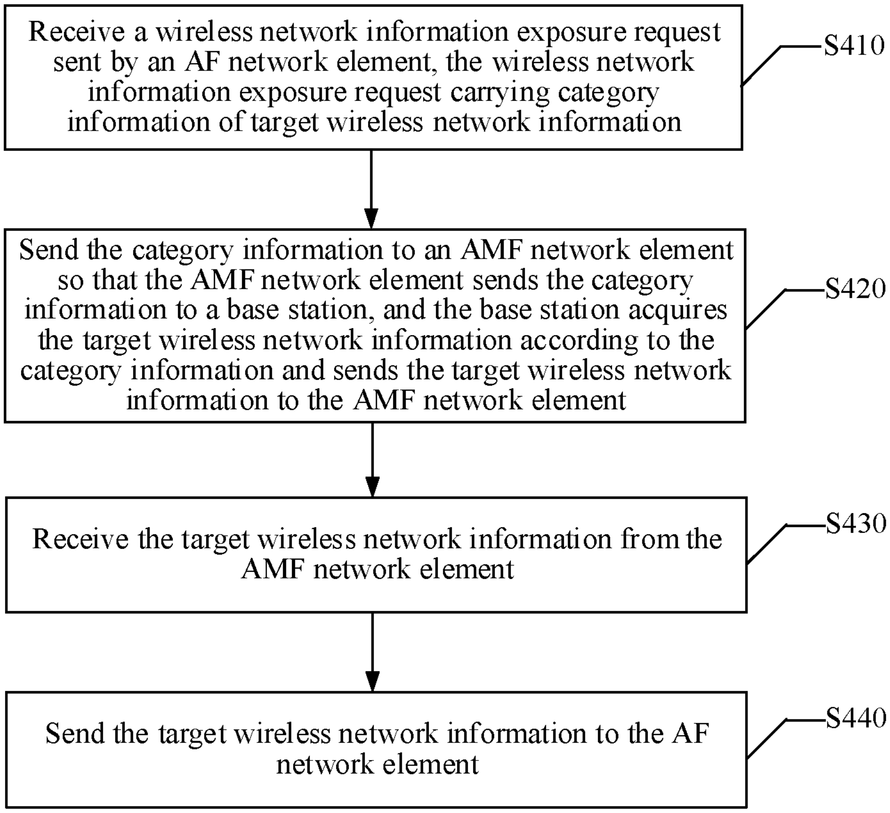
FIG. 4 is a schematic flowchart of a network information exposure method according to another embodiment.

FIG. 4 is a schematic flowchart of a network information exposure method according to another embodiment of the disclosure. The method according to the embodiment of FIG. 4 may be performed by an electronic device, for example, by the NEF network element in FIG. 1.

As shown in FIG. 4, the method according to some embodiments of the disclosure may include the following operations.

Operation S410: Receive a wireless network information exposure request sent by an AF network element, the wireless network information exposure request carrying category information of target wireless network information.

Operation S420: Send or transmit the category information to an AMF network element so that the AMF network element sends or transmits the category information to a base station, and the base station acquires the target wireless network information according to the category information and sends or transmits the target wireless network information to the AMF network element.

In some embodiments, the wireless network information exposure request may further include a target network slice and/or a target DNN.

The sending or transmitting of the category information to an AMF network element may include: sending or transmitting a subscription request to an SMF network element, the subscription request carrying the target network slice and/or the target DNN; receiving a notification message returned by the SMF network element, the notification message carrying a target UE ID, an AMF ID, and a target QoS flow ID that correspond to a target session, the target session being established according to the target network slice and/or the target DNN; and sending or transmitting the category information, the target UE ID, and the target QoS flow ID to the AMF network element corresponding to the AMF ID.

In some embodiments, the wireless network information exposure request further carries an information reporting manner.

The sending or transmitting the category information, the target UE ID, and the target QoS flow ID to the AMF network element corresponding to the AMF ID may include: generating a RAN exposure request container, the RAN exposure request container including the category information and the information reporting manner; and sending or transmitting the RAN exposure request container, the target UE ID, and the target QoS flow ID to the AMF network element so that the AMF network element sends or transmits the RAN exposure request container, the target UE ID, and the target QoS flow ID to the base station.

In some embodiments, based on the wireless network information exposure request further carrying request application range information, the subscription request may further carry the request application range information.

The notification message is received from the SMF network element based on establishment of the target session according to the request application range information.

In some embodiments, based on the request application range information including a target UE ID, the notification message is received from the SMF network element based on establishment of a target session of a target UE corresponding to the target UE ID.

In some embodiments, based on the request application range information including a target UE group ID, the notification message is received from the SMF network element based on establishment of a target session of a target UE in a target UE group corresponding to the target UE group ID.

In some embodiments, based on the request application range information including target time period information, the notification message is received from the SMF network element based on establishment of a target session of a target UE within a target time period corresponding to the target time period information.

In some embodiments, based on the request application range information including target geographic range information, the notification message is received from the SMF network element based on establishment of a target session of a target UE within a target geographic range corresponding to the target geographic range information.

In some embodiments, the sending or transmitting a subscription request to an SMF network element may include: authenticating the wireless network information exposure request according to a protocol of the AF network element; and returning, based on successful authentication of the wireless network information exposure request, a request acceptance response message to the AF network element, and sending or transmitting the subscription request to the SMF network element.

In some embodiments, the method may further include: returning, based on failed authentication of the wireless network information exposure request, a request rejection response message to the AF network element.

Operation S430: Receive the target wireless network information from the AMF network element.

In some embodiments, the receiving the target wireless network information from the AMF network element may include: receiving a RAN exposure information container from the AMF network element, the RAN exposure information container including the target wireless network information.

Operation S440: Send or transmit the target wireless network information to the AF network element.

In some embodiments, the sending or transmitting of the target wireless network information to the AF network element may include: forwarding the RAN exposure information container to the AF network element.

Figure 5:
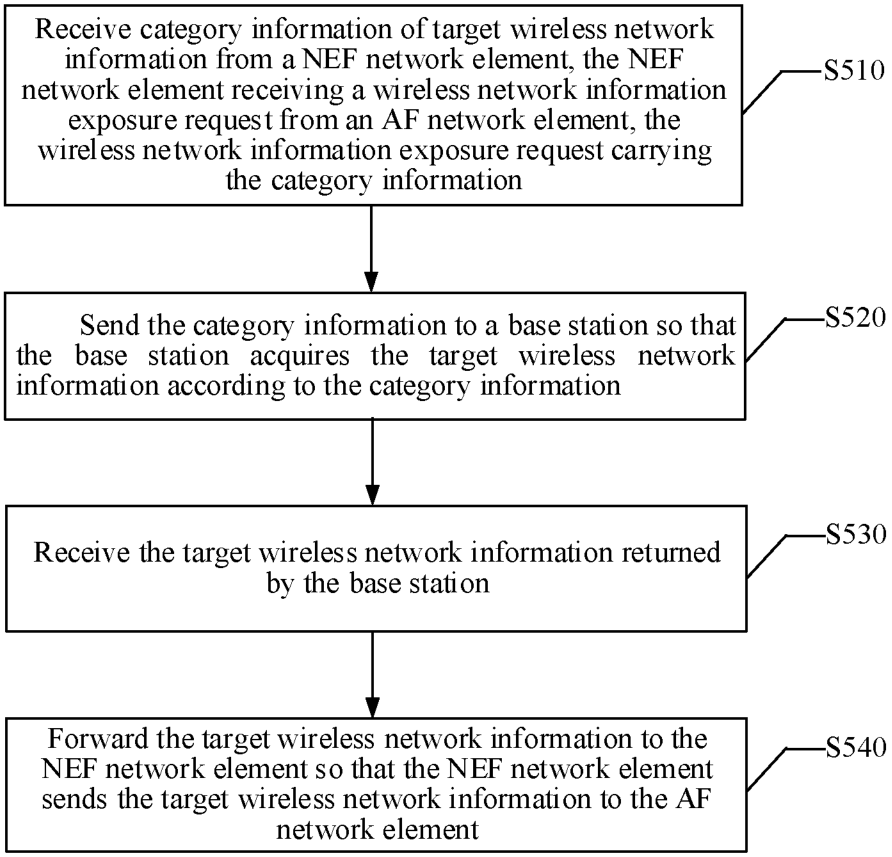
FIG. 5 is a schematic flowchart of a network information exposure method according to yet another embodiment.

FIG. 5 is a schematic flowchart of a network information exposure method according to yet another embodiment of the disclosure. The method according to the embodiment of FIG. 5 may be performed by an electronic device, for example, by an AMF network element.

As shown in FIG. 5, the method according to some embodiments of the disclosure may include the following operations.

Operation S510: Receive category information of target wireless network information from a NEF network element, the NEF network element receiving a wireless network information exposure request from an AF network element, the wireless network information exposure request carrying the category information.

In some embodiments, the wireless network information exposure request may further carry an information reporting manner.

The receiving category information of target wireless network information from a NEF network element may include: receiving a RAN exposure request container, a target UE ID, and a target QoS flow ID that are transmitted by the NEF network element.

The RAN exposure request container transmitted by the NEF network element includes the category information and the information reporting manner.

Operation S520: Send or transmit the category information to a base station so that the base station acquires the target wireless network information according to the category information.

In some embodiments, the sending or transmitting the category information to a base station may include: sending or transmitting the RAN exposure request container, the target UE ID, and the target QoS flow ID to the base station so that the base station determines a target QoS flow of a target UE according to the target UE ID and the target QoS flow ID and sets the RAN exposure request container in the target QoS flow.

Operation S530: Receive the target wireless network information returned by the base station.

In some embodiments, the receiving the target wireless network information returned by the base station may include: receiving a RAN exposure information container sent by the base station, the RAN exposure information container including the target wireless network information.

Operation S540: Forward the target wireless network information to the NEF network element so that the NEF network element sends or transmits the target wireless network information to the AF network element.

In some embodiments, the forwarding the target wireless network information to the NEF network element may include: forwarding the RAN exposure information container to the NEF network element.

Figure 6:
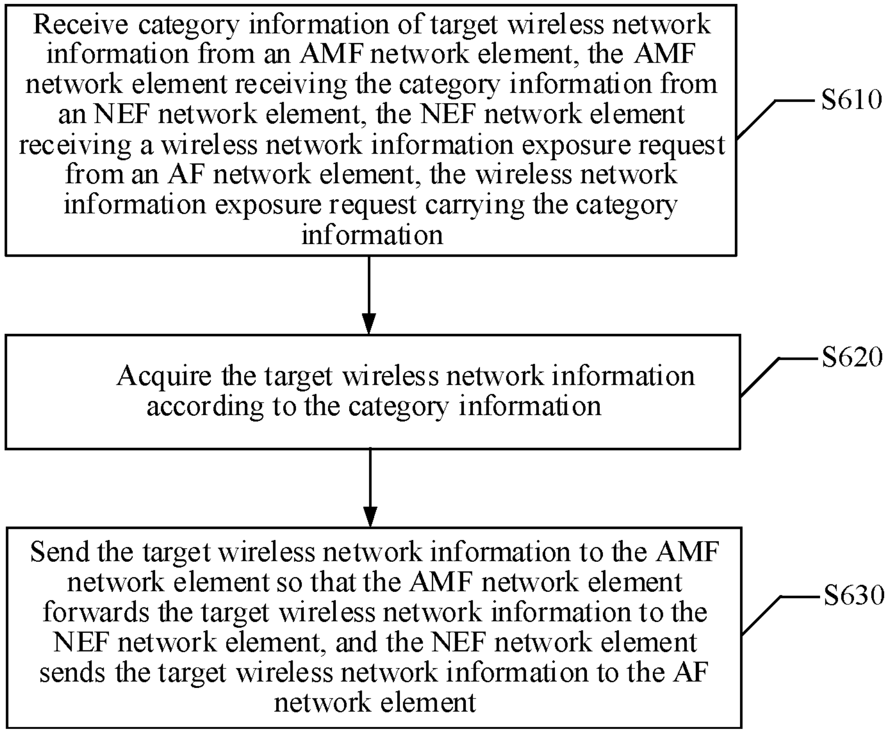
FIG. 6 is a schematic flowchart of a network information exposure method according to another embodiment.

FIG. 6 is a schematic flowchart of a network information exposure method according to another embodiment of the disclosure. The method according to the embodiment of FIG. 6 may be performed by an electronic device, for example, by a base station.

As shown in FIG. 6, the method according to some embodiments of the disclosure may include the following operations.

Operation S610: Receive category information of target wireless network information from an AMF network element, the AMF network element receiving the category information from an NEF network element, the NEF network element receiving a wireless network information exposure request from an AF network element, the wireless network information exposure request carrying the category information.

In some embodiments, the wireless network information exposure request may further carry an information reporting manner.

The receiving category information of target wireless network information from an AMF network element may include: receiving a RAN exposure request container, a target UE ID, and a target QoS flow ID from the AMF network element, where the RAN exposure request container includes the category information and the information reporting manner.

Operation S620: Acquire the target wireless network information according to the category information.

In some embodiments, the acquiring the target wireless network information according to the category information may include: determining a target QoS flow of a target UE according to the target UE ID and the target QoS flow ID, and setting the RAN exposure request container in the target QoS flow, in order to detect RAN-side information of the target UE and acquire the target wireless network information matching the category information.

Operation S630: Send or transmit the target wireless network information to the AMF network element so that the AMF network element forwards the target wireless network information to the NEF network element, and the NEF network element sends or transmits the target wireless network information to the AF network element.

In some embodiments, the sending or transmitting of the target wireless network information to the AMF network element may include: encapsulating the target wireless network information in a RAN exposure information container based on the information reporting manner being satisfied; and sending or transmitting the RAN exposure information container to the AMF network element so that the AMF network element sends or transmits the RAN exposure information container to the NEF network element.

Figure 7:
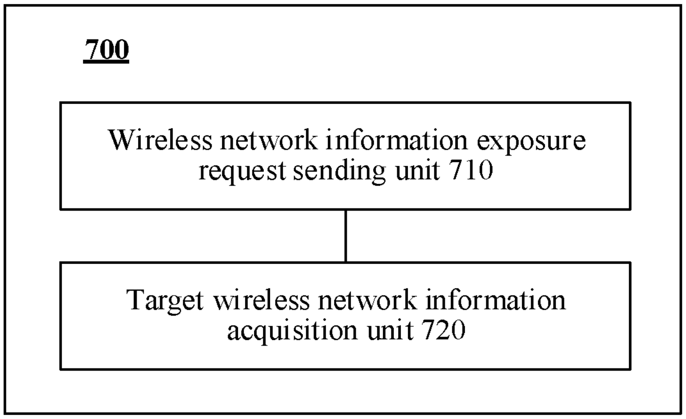
FIG. 7 is a schematic block diagram of a network information exposure apparatus according to an embodiment.

FIG. 7 is a schematic block diagram of a network information exposure apparatus according to an embodiment of the disclosure. The network information exposure apparatus is an AF network element, or the network information exposure apparatus is applied to an AF network element. As shown in FIG. 7, the network information exposure apparatus 700 according to some embodiments of the disclosure may include: a wireless network information exposure request sending unit 710 and a target wireless network information acquisition unit 720.

The wireless network information exposure request sending unit 710 is configured to send or transmit a wireless network information exposure request to a NEF network element, the wireless network information exposure request carrying category information of target wireless network information, so that the NEF network element transmits the category information to a base station, and the base station acquires the target wireless network information according to the category information and sends or transmits the target wireless network information to the NEF network element.

The target wireless network information acquisition unit 720 is configured to acquire the target wireless network information returned by the NEF network element.

In some embodiments, the wireless network information exposure request may further include a target network slice and/or a target DNN, the target wireless network information matches the category information, and the target wireless network information belongs to a target QoS flow of a target UE establishing a target session according to the target network slice and/or the target DNN.

In some embodiments, the category information of the target wireless network information may include at least one of PER information, access cell information, and average data bit rate information.

In some embodiments, the wireless network information exposure request may further carry an information reporting manner, and the base station reports the target wireless network information according to the information reporting manner.

In some embodiments, the wireless network information exposure request further carries an information reporting cycle based on the information reporting manner being a periodic reporting manner, and the base station reports the target wireless network information according to the information reporting cycle.

In some embodiments, the wireless network information exposure request further carries an event based on the information reporting manner being an event trigger, and the base station reports the target wireless network information according to the event trigger.

In some embodiments, the wireless network information exposure request may further carry request application range information, and the acquiring the target wireless network information returned by the NEF network element includes:

receiving, from the NEF network element, the target wireless network information satisfying the request application range information.

In some embodiments, the request application range information includes a target UE ID, and the receiving, from the NEF network element, the target wireless network information satisfying the request application range information includes:

receiving the target wireless network information of a target UE corresponding to the target UE ID.

In some embodiments, the request application range information includes a target UE group ID, and the receiving, from the NEF network element, the target wireless network information satisfying the request application range information includes:

receiving the target wireless network information of a target UE in a target UE group corresponding to the target UE group ID.

In some embodiments, the request application range information includes target time period information, and the receiving, from the NEF network element, the target wireless network information satisfying the request application range information includes:

receiving the target wireless network information of a target UE satisfying the target time period information.

In some embodiments, the request application range information includes target geographic range information, and the receiving, from the NEF network element, the target wireless network information satisfying the request application range information includes:

receiving the target wireless network information of a target UE within a target geographic range corresponding to the target geographic range information.

In some embodiments, the target wireless network information acquisition unit 720 includes: a RAN exposure information container obtaining unit configured to receive a RAN exposure information container from the NEF network element, the RAN exposure information container carrying the target wireless network information. The RAN exposure information container is received by the NEF network element from the base station through an AMF network element.

In some embodiments, the target wireless network information is encapsulated in the RAN exposure information container in a data exchange format or in a code stream manner.

Specific implementation of each unit in the AF network element according to some embodiments of the disclosure may be obtained with reference to the content in the above network information exposure method. Details are not described herein again.

Figure 8:
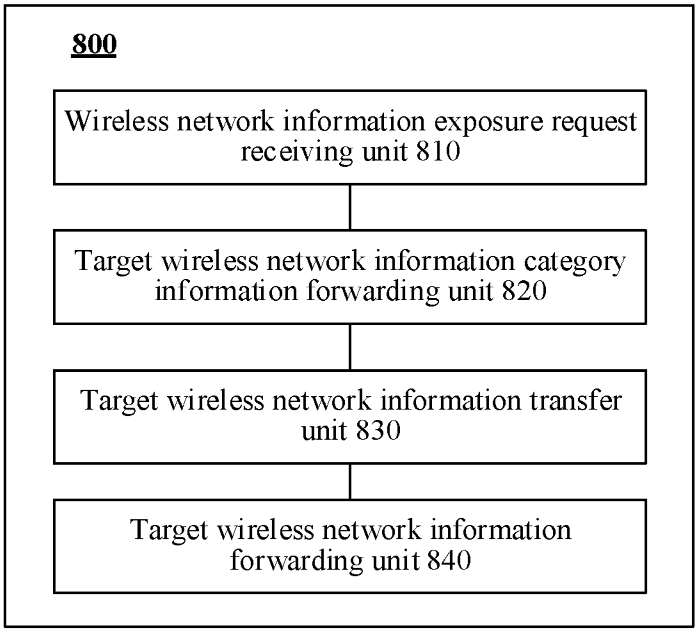
FIG. 8 is a schematic block diagram of a network information exposure apparatus according to another embodiment.

FIG. 8 is a schematic block diagram of a network information exposure apparatus according to another embodiment of the disclosure. The network information exposure apparatus is a NEF network element, or the network information exposure apparatus is applied to a NEF network element. As shown in FIG. 8, the network information exposure apparatus 800 according to some embodiments of the disclosure may include a wireless network information exposure request receiving unit 810, a target wireless network information category information forwarding unit 820, a target wireless network information transfer unit 830, and a target wireless network information forwarding unit 840.

The wireless network information exposure request receiving unit 810 is configured to receive a wireless network information exposure request sent by an AF network element, the wireless network information exposure request carrying category information of target wireless network information.

The target wireless network information category information forwarding unit 820 is configured to send or transmit the category information to an AMF network element so that the AMF network element sends or transmits the category information to a base station, and the base station acquires the target wireless network information according to the category information and sends or transmits the target wireless network information to the AMF network element.

The target wireless network information transfer unit 830 is configured to receive the target wireless network information from the AMF network element.

The target wireless network information forwarding unit 840 is configured to send or transmit the target wireless network information to the AF network element.

In some embodiments, the wireless network information exposure request may further include a target network slice and/or a target DNN.

The target wireless network information category information forwarding unit 820 may include:

a subscription request sending unit configured to send or transmit a subscription request to an SMF network element, the subscription request carrying the target network slice and/or the target DNN;

a notification message receiving unit configured to receive a notification message returned by the SMF network element, the notification message carrying a target UE ID, an AMF ID, and a target QoS flow ID that correspond to a target session, the target session being established according to the target network slice and/or the target DNN; and a target UE information sending unit configured to send or transmit the category information, the target UE ID, and the target QoS flow ID to the AMF network element corresponding to the AMF ID.

In some embodiments, the wireless network information exposure request may further carry an information reporting manner.

The target UE information sending unit may include:

a RAN exposure request container generation unit configured to generate a RAN exposure request container, the RAN exposure request container including the category information and the information reporting manner; and a RAN exposure request container sending unit configured to send or transmit the RAN exposure request container, the target UE ID, and the target QoS flow ID to the AMF network element so that the AMF network element sends or transmits the RAN exposure request container, the target UE ID, and the target QoS flow ID to the base station.

In some embodiments, based on the wireless network information exposure request further carrying request application range information, the subscription request may further carry the request application range information.

The notification message is received from the SMF network element based on establishment of the target session according to the request application range information.

In some embodiments, based on the request application range information including a target UE ID, the notification message is received from the SMF network element based on establishment of a target session of a target UE corresponding to the target UE ID.

In some embodiments, based on the request application range information including a target UE group ID, the notification message is received from the SMF network element based on establishment of a target session of a target UE in a target UE group corresponding to the target UE group ID.

In some embodiments, based on the request application range information including target time period information, the notification message is received from the SMF network element based on establishment of a target session of a target UE within a target time period corresponding to the target time period information.

In some embodiments, based on the request application range information including target geographic range information, the notification message is received from the SMF network element based on establishment of a target session of a target UE within a target geographic range corresponding to the target geographic range information.

In some embodiments, the subscription request sending unit may include:

a request authentication unit configured to authenticate the wireless network information exposure request according to a protocol of the AF network element;

a request acceptance unit configured to return, based on successful authentication of the wireless network information exposure request, a request acceptance response message to the AF network element; and a subscription request transmission unit configured to send or transmit the subscription request to the SMF network element.

In some embodiments, the network information exposure apparatus 800 may further include:

a request rejection unit configured to return, based on failed authentication of the wireless network information exposure request, a request rejection response message to the AF network element.

In some embodiments, the target wireless network information transfer unit 830 may be configured to receive a RAN exposure information container from the AMF network element, and the RAN exposure information container may include the target wireless network information.

In some embodiments, the target wireless network information forwarding unit 840 may be configured to forward the RAN exposure information container to the AF network element.

Specific implementation of each unit in the NEF network element according to some embodiments of the disclosure may be obtained with reference to the content in the above network information exposure method. Details are not described herein again.

Figure 9:
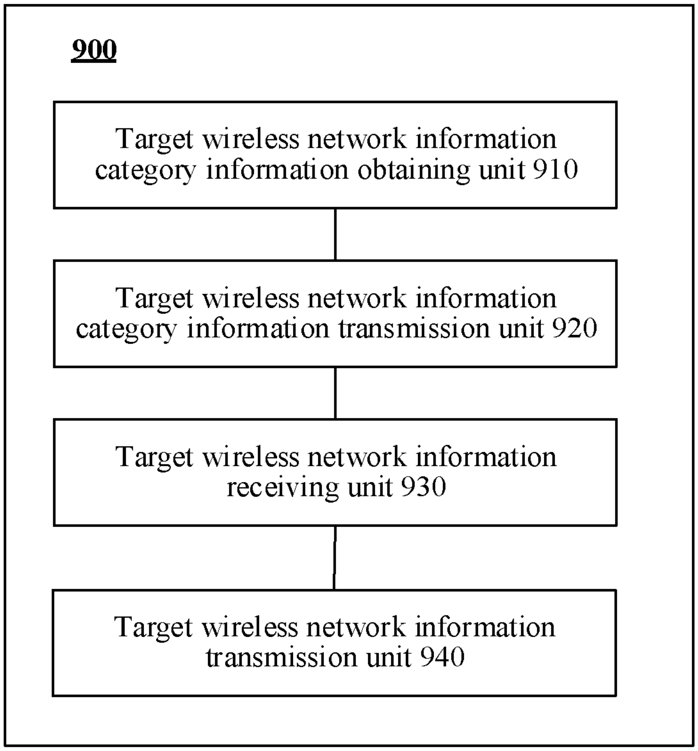
FIG. 9 is a schematic block diagram of a network information exposure apparatus according to yet another embodiment.

FIG. 9 is a schematic block diagram of a network information exposure apparatus according to yet another embodiment of the disclosure. The network information exposure apparatus is an AMF network element, or the network information exposure apparatus is applied to an AMF network element. As shown in FIG. 9, the network information exposure apparatus 900 according to some embodiments of the disclosure may include a target wireless network information category information obtaining unit 910, a target wireless network information category information transmission unit 920, a target wireless network information receiving unit 930, and a target wireless network information transmission unit 940.

The target wireless network information category information obtaining unit 910 is configured to receive category information of target wireless network information from a NEF network element. The NEF network element receives a wireless network information exposure request from an AF network element, and the wireless network information exposure request carries the category information.

The target wireless network information category information transmission unit 920 is configured to send or transmit the category information to a base station so that the base station acquires the target wireless network information according to the category information.

The target wireless network information receiving unit 930 is configured to receive the target wireless network information returned by the base station.

The target wireless network information transmission unit 940 is configured to forward the target wireless network information to the NEF network element so that the NEF network element sends or transmits the target wireless network information to the AF network element.

In some embodiments, the wireless network information exposure request may further carry an information reporting manner.

The target wireless network information category information obtaining unit 910 may include:

a RAN exposure request container receiving unit configured to receive a RAN exposure request container, a target UE ID, and a target QoS flow ID from the AMF network element. The RAN exposure request container includes the category information and the information reporting manner.

In some embodiments, the target wireless network information category information transmission unit 920 may include:

a RAN exposure request container forwarding unit configured to send or transmit the RAN exposure request container, the target UE ID, and the target QoS flow ID to the base station so that the base station determines a target QoS flow of a target UE according to the target UE ID and the target QoS flow ID and sets the RAN exposure request container in the target QoS flow.

In some embodiments, the target wireless network information receiving unit 930 may be configured to receive a RAN exposure information container sent by the base station, and the RAN exposure information container includes the target wireless network information.

In some embodiments, the target wireless network information transmission unit 940 may be configured to forward the RAN exposure information container to the NEF network element.

Specific implementation of each unit in the AMF network element according to some embodiments of the disclosure may be obtained with reference to the content in the above network information exposure method. Details are not described herein again.

Figure 10:
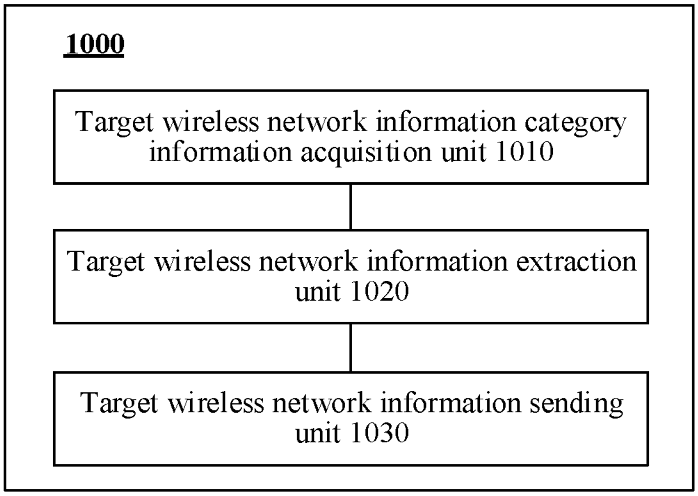
FIG. 10 is a schematic block diagram of a network information exposure apparatus according to another embodiment.

FIG. 10 is a schematic block diagram of a network information exposure apparatus according to another embodiment of the disclosure. The network information exposure apparatus is a base station, or the network information exposure apparatus is applied to a base station. As shown in FIG. 10, the network information exposure apparatus 1000 according to some embodiments of the disclosure may include a target wireless network information category information acquisition unit 1010, a target wireless network information extraction unit 1020, and a target wireless network information sending unit 1030.

The target wireless network information category information acquisition unit 1010 is configured to receive category information of target wireless network information from an AMF network element. The AMF network element receives the category information from an NEF network element. The NEF network element receives a wireless network information exposure request from an AF network element. The wireless network information exposure request carries the category information.

The target wireless network information extraction unit 1020 is configured to acquire the target wireless network information according to the category information of the target wireless network information.

The target wireless network information sending unit 1030 is configured to send or transmit the target wireless network information to the AMF network element so that the AMF network element forwards the target wireless network information to the NEF network element, and the NEF network element sends or transmits the target wireless network information to the AF network element. In some embodiments, the wireless network information exposure request may further carry an information reporting manner.

The target wireless network information category information acquisition unit 1010 may include:

a target UE related information obtaining unit configured to receive a RAN exposure request container, a target UE ID, and a target QoS flow ID from the AMF network element. The RAN exposure request container includes the category information and the information reporting manner.

In some embodiments, the target wireless network information extraction unit 1020 may include:

a RAN exposure request container setting unit configured to determine a target QoS flow of a target UE according to the target UE ID and the target QoS flow ID, and set the RAN exposure request container in the target QoS flow, in order to detect RAN-side information of the target UE and acquire the target wireless network information matching the category information.

In some embodiments, the target wireless network information sending unit 1030 may include:

a target wireless network information encapsulation unit configured to encapsulate the target wireless network information in a RAN exposure information container based on the information reporting manner being satisfied; and send or transmit the RAN exposure information container to the AMF network element so that the AMF network element sends or transmits the RAN exposure information container to the NEF network element.

Specific implementation of each unit in the base station according to some embodiments of the disclosure may be obtained with reference to the content in the above network information exposure method. Details are not described herein again.

Figure 11:
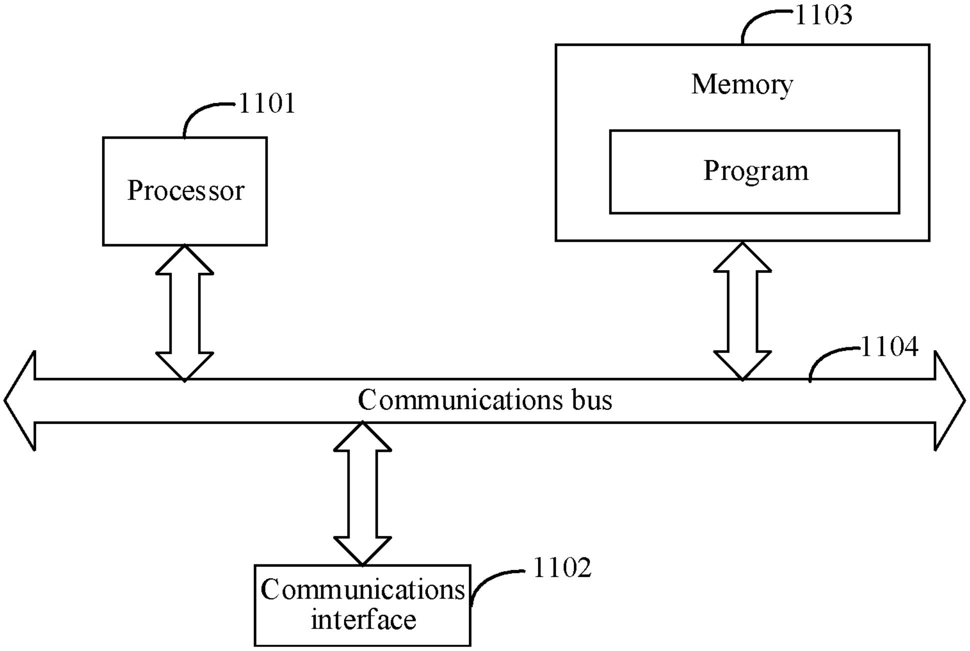
FIG. 11 is a schematic block diagram of an electronic device according to an embodiment.

Refer to FIG. 11 below which is a schematic structural diagram of an electronic device adapted to implement an embodiment of the disclosure. The electronic device shown in FIG. 11 is merely an example, and embodiments are not limited thereto. The electronic device in FIG. 11 may include an offline server and a service server. In embodiments, the electronic device of FIG. 11 may include or be used to implement one or more of the elements discussed above, for example the network information exposure apparatus 700, the network information exposure apparatus 800, the network information exposure apparatus 900, and the network information exposure apparatus 1000 discussed above.

Referring to FIG. 11, the electronic device according to some embodiments of the disclosure may include: a processor 1101, a communications interface 1102, a memory 1103, and a communications bus 1104.

Communication among the processor 1101, the communications interface 1102, and the memory 1103 is implemented through the communications bus 1104.

In some embodiments, the communications interface 1102 may be an interface of a communications module, such as an interface of a global system for mobile communications (GSM) module. The processor 1101 is configured to execute a program. The memory 1103 is configured to store the program. The program may include a computer program, and the computer program includes a computer operating instruction. The program may include: a program of a video client.

The processor 1101 may be a central processing unit (CPU) or an application-specific integrated circuit (ASIC), or may be one or more integrated circuits configured to implement the embodiments of the disclosure.

The memory 1103 may include a high-speed RAM memory, and may further include a non-volatile memory, for example, at least one magnetic disk memory.

The program may be specifically used for: sending a wireless network information exposure request to a NEF network element, the wireless network information exposure request carrying category information of target wireless network information, so that the NEF network element transmits the category information to a base station, and the base station acquires the target wireless network information according to the category information and sends or transmits the target wireless network information to the NEF network element; and acquiring the target wireless network information returned by the NEF network element.

In some embodiments, the program may be specifically used for: receiving a wireless network information exposure request sent by an AF network element, the wireless network information exposure request carrying category information of target wireless network information; sending or transmitting the category information to an AMF network element so that the AMF network element sends or transmits the category information to a base station, and the base station acquires the target wireless network information according to the category information and sends or transmits the target wireless network information to the AMF network element; receiving the target wireless network information from the AMF network element; and sending the target wireless network information to the AF network element.

In some embodiments, the program may be specifically used for: receiving category information of target wireless network information from a NEF network element, the NEF network element receiving a wireless network information exposure request from an AF network element, the wireless network information exposure request carrying the category information; sending or transmitting the category information to a base station so that the base station acquires the target wireless network information according to the category information; receiving the target wireless network information returned by the base station; and forwarding the target wireless network information to the NEF network element so that the NEF network element sends or transmits the target wireless network information to the AF network element.

In some embodiments, the program may be specifically used for: receiving category information of target wireless network information from an AMF network element, the AMF network element receiving the category information from an NEF network element, the NEF network element receiving a wireless network information exposure request from an AF network element, the wireless network information exposure request carrying the category information; acquiring the target wireless network information according to the category information; and sending or transmitting the target wireless network information to the AMF network element so that the AMF network element forwards the target wireless network information to the NEF network element, and the NEF network element sends or transmits the target wireless network information to the AF network element.

Although a plurality of units of a device configured to perform actions are discussed in the foregoing detailed description, such division is not mandatory. Actually, according to the implementations of the disclosure, the features and functions of two or more units described above may be specifically implemented in one unit. On the contrary, the features and functions of one unit described above may be further divided to be embodied by a plurality of units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the implementations of the disclosure.

After considering the specification and practicing the present disclosure, a person skilled in the art may easily conceive of other implementation solutions of the disclosure. The disclosure is intended to cover any variations, uses, or adaptive changes of the disclosure. These variations, uses, or adaptive changes follow the general principles of the disclosure and include common general knowledge or common technical means in the art, which are not disclosed in the disclosure. The specification and the embodiments are considered as merely exemplary, and the real scope and spirit of the disclosure are pointed out in the following claims.

It is to be understood that the disclosure is not limited to the precise structures described above and shown in the accompanying drawings, and various modifications and changes can be made without departing from the scope of the disclosure. The scope of the disclosure is defined only by the appended claims.

What is claimed is:

1. A method for network information exposure, performed by an electronic device, the method comprising:

receiving, by a network exposure function (NEF) network element included in the electronic device, a wireless network information exposure request from an application function (AF) network element, the wireless network information exposure request comprising category information associated with target wireless network information;

transmitting, by the NEF network element, the category information to an access and mobility management function (AMF) network element;

receiving, by the NEF network element, the target wireless network information from the AMF network element, wherein the target wireless network information is obtained by the AMF network element from a base station according to the category information; and transmitting, by the NEF network element, network capability information comprising the target wireless network information to the AF network element.

2. The method according to claim 1, wherein the wireless network information exposure request further comprises at least one from among a target network slice and a target data network name (DNN), and wherein the transmitting of the category information to the AMF network element comprises:

transmitting a subscription request to a session management function (SMF) network element, the subscription request comprising the at least one from among the target network slice and the target DNN;

receiving a notification message from the SMF network element, the notification message comprising a target user equipment (UE) identifier (ID), an AMF ID, and a target quality of service (QOS) flow ID corresponding to a target session, the target session being established according to the at least one from among the target network slice and the target DNN; and transmitting the category information, the target UE ID, and the target QoS flow ID to the AMF network element corresponding to the AMF ID.

3. The method according to claim 2, wherein the wireless network information exposure request specifies an information reporting manner, and wherein the transmitting of the category information, the target UE ID, and the target QoS flow ID to the AMF network element comprises:

generating a radio access network (RAN) exposure request container comprising the category information and the information reporting manner; and transmitting the RAN exposure request container, the target UE ID, and the target QoS flow ID to the AMF network element to be transmitted to the base station.

4. The method according to claim 3, wherein based on the information reporting manner being a periodic reporting manner, the wireless network information exposure request further specifies an information reporting cycle, and wherein the base station reports the target wireless network information according to the information reporting cycle.

5. The method according to claim 3, wherein based on the information reporting manner being an even trigger manner, the wireless network information exposure request further specifies an event, and wherein the base station reports the target wireless network information according to the event.

6. The method according to claim 2, wherein based on the wireless network information exposure request comprising request application range information, the subscription request further comprises the request application range information;

wherein the notification message is received from the SMF network element based on establishment of the target session according to the request application range information.

7. The method according to claim 6, wherein based on the request application range information comprising a target UE ID, the notification message is received from the SMF network element based on establishment of a target session of a target UE corresponding to the target UE ID.

8. The method according to claim 6, wherein based on the request application range information comprising a target UE group ID, the notification message is received from the SMF network element in response to establishment of a target session of a target UE in a target UE group corresponding to the target UE group ID.

9. The method according to claim 6, wherein based on the request application range information comprising target time period information, the notification message is received from the SMF network element based on establishment of a target session of a target UE within a target time period corresponding to the target time period information.

10. The method according to claim 6, wherein based on the request application range information comprising target geographic range information, the notification message is received from the SMF network element based on establishment of a target session of a target UE within a target geographic range corresponding to the target geographic range information.

11. The method according to claim 2, wherein the transmitting of the subscription request comprises:

authenticating the wireless network information exposure request according to a protocol of the AF network element; and transmitting, based on a successful authentication of the wireless network information exposure request, a request acceptance response message to the AF network element; and transmitting the subscription request to the SMF network element.

12. The method according to claim 11, further comprising transmitting, based on a failed authentication of the wireless network information exposure request, a request rejection response message to the AF network element.

13. The method according to claim 1, wherein the receiving of the target wireless network information comprises receiving a radio access network (RAN) exposure information container from the AMF network element, the RAN exposure information container comprising the target wireless network information, and wherein the transmitting of the target wireless network information to the AF network element comprises forwarding the RAN exposure information container to the AF network element.

14. The method according to claim 13, wherein the target wireless network information is encapsulated in the RAN exposure information container in a data exchange format or in a code stream manner.

15. The method according to claim 1, wherein the category information comprises at least one of packet error ratio (PER) information, access cell information, and average data bit rate information.

16. A network information exposure apparatus, comprising:

at least one memory configured to store program code; and at least one processor configured to read the program code and operate as instructed by the program code, the program code including:

first receiving code configured to cause the at least one processor to receive, by a network exposure function (NEF) network element included in the network information exposure device, a wireless network information exposure request from an AF network element, the wireless network information exposure request comprising category information of target wireless network information;

first transmitting code configured to cause the at least one processor to transmit, by the NEF, the category information to an access and mobility management function (AMF) network element;

second receiving code configured to cause the at least one processor to receive, by the NEF, the target wireless network information from the AMF network element, wherein the target wireless network information is obtained by the AMF network element from a base station according to the category information; and second transmitting code configured to cause the at least one processor to transmit, by the NEF, network capability information comprising the target wireless network information to the AF network element.

17. The network information exposure apparatus according to claim 16, wherein the wireless network information exposure request further comprises at least one from among a target network slice and a target data network name (DNN), and wherein the first transmitting code comprises:

third transmitting code configured to cause the at least one processor to transmit a subscription request to a session management function (SMF) network element, the subscription request comprising the at least one from among the target network slice and the target DNN;

third receiving code configured to cause the at least one processor to receive a notification message from the SMF network element, the notification message comprising a target user equipment (UE) identifier (ID), an AMF ID, and a target quality of service (QOS) flow ID corresponding to a target session, the target session being established according to the at least one from among the target network slice and the target DNN; and wherein the second transmitting code is further configured to cause the at least one processor to transmit the category information, the target UE ID, and the target QoS flow ID to the AMF network element corresponding to the AMF ID.

18. The network information exposure apparatus according to claim 17, wherein the wireless network information exposure request specifies an information reporting manner, and wherein the second transmitting code further comprises:

generating code configured to cause the at least one processor to generate a radio access network (RAN) exposure request container comprising the category information and the information reporting manner; and fifth transmitting code configured to cause the at least one processor to transmit the RAN exposure request container, the target UE ID, and the target QoS flow ID to the AMF network element to be transmitted to the base station.

19. The network information exposure apparatus according to claim 16, wherein the second receiving code is further configured to cause the at least one processor to receive a radio access network (RAN) exposure information container from the AMF network element, the RAN exposure information container comprising the target wireless network information, and wherein the second transmitting code is further configured to cause the at least one processor to forward the RAN exposure information container to the AF network element.

20. A non-transitory computer-readable medium storing instructions, the instructions comprising: one or more instructions that, when executed by one or more processors of a network information exposure device, cause the one or more processors to:

receive, by a network exposure function (NEF) network element included in the network information exposure device, a wireless network information exposure request from an AF network element, the wireless network information exposure request comprising category information of target wireless network information;

transmit, by the NEF network element, the category information to an access and mobility management function (AMF) network element;

receive, by the NEF network element, the target wireless network information from the AMF network element, wherein the target wireless network information is obtained by the AMF network element from a base station according to the category information; and transmit, by the NEF network element, network capability information comprising the target wireless network information to the AF network element.

* * * * *